B. KUHNS.
Feed-Wheel for Grain-Drills.

No. 161,688. Patented April 6, 1875.

Attest
C. M. Connell
E. H. Bulley

Inventor
Benjamin Kuhns
Per Blanchard & Singleton
Attys

THE GRAPHIC CO.PHOTO-LITH.39 & 41 PARK PLACE,N.Y.

UNITED STATES PATENT OFFICE.

BENJAMIN KUHNS, OF DAYTON, OHIO.

IMPROVEMENT IN FEED-WHEELS FOR GRAIN-DRILLS.

Specification forming part of Letters Patent No. 161,688, dated April 6, 1875; application filed March 9, 1875.

*To all whom it may concern:*

Be it known that I, BENJAMIN KUHNS, of Dayton, in the county of Montgomery and State of Ohio, have invented certain new and useful Improvements in Feed - Wheels for Grain-Drills; and I do hereby declare that the following is a full, clear, and exact description thereof, which will enable others skilled in the art to which it pertains to make and use the same, reference being had to the accompanying drawings, and to the letters of reference marked thereon, which form a part of this specification—

Figure 1:
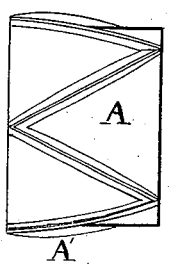
Figure 2:
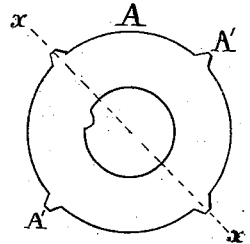
Figure 3:
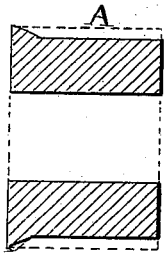
Figure 4:
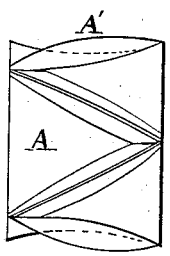
Figure 5:
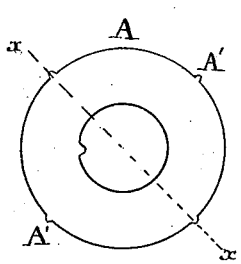
Figure 6:
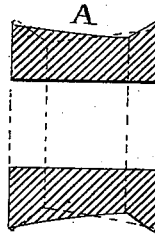
Figure 7:
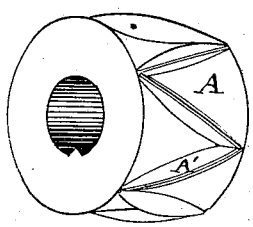

Figure 1 being an elevation of the feed-wheel, showing the converging outwardly-projecting flanges which control the delivery of the grain to the tubes of the drill. Fig. 2 is an end view of the same; and Fig. 3 is a section on line *x x* of Fig. 2, the dotted lines showing the projecting flanges. Figs. 4, 5, 6, and 7 show, respectively, an elevation, an end view, a horizontal sectional elevation, and a perspective view of a modified form of the hub or body of the wheel, the outer surface of which is concave in form, instead of being cylindrical, as in the one shown in Figs. 1, 2, and 3.

This invention relates to a feed-wheel for grain-drills, and for broadcast-sowers; and it consists in the peculiar construction of such wheel, the body of which is cylindrical in form, or is concave upon its outer surface, upon which there are projecting converging flanges, which project beyond the largest diameter of the body or hub, as shown in the drawings, for a purpose which will be hereinafter described.

A in the drawings refers to the body or hub of the wheel, which may be of any required diameter, and cylindrical in form; or it may be concave upon its outer surface, as preferred. There is formed in the center of the hub an aperture for the reception of the shaft which gives motion to the wheels, there being one placed in each aperture in the seed-box, from which the seed is delivered to the drills. The length of these wheels is to be governed by the size of the aperture in which they are placed, or by the amount of grain which it is desirable to distribute on a given area of ground, and to prevent any grain from passing the wheel which is not controlled by the flanges thereof. That portion of the seed-box in which they move is to be so constructed as to come so nearly in contact with its ends as to prevent any grain from passing at these points.

In order that a regulated amount of grain may be allowed to pass the wheels, they are provided with outwardly-projecting flanges A' A', which, owing to their convergence and divergence toward and from each other, form receptacles, into which the grain falls from the seed-box, the flanges alternately admitting the supply of grain and cutting it off, as a consequence of which it is delivered to the drills in measured quantities.

Owing to the peculiar construction of the projecting flanges, the direction given to the grain as it enters the tubes is changed from side to side thereof, as the points where the flanges meet are changed by the rotation of the wheel.

I am aware that feed-wheels for grain-drills have heretofore been made with zigzag grain-cells upon their surface, the points of contact of the flanges which form them being at the centers of such wheels, the consequence of which is that the grain is all directed to the center of the tube which conducts it to the hoes, and hence it is deposited in a single row in the earth, or, in other words, is not properly distributed.

I am also aware that wheels having projecting flanges, arranged as in the present case, have been patented; but such wheels had annular flanges upon each of their ends, which projected beyond the lateral ones, as a consequence of which they are made more difficult of construction, and are liable to be clogged and their operation interfered with by the grain getting between such flange and the aperture in the seed-box in which it rotates.

I make no claim here to either of the above-referred-to wheels; but

Having described my invention, what I do claim, and desire to secure by Letters Patent, is—

The within-described feed-wheel, consisting of the hub A and projecting flanges A', the flanges converging toward and diverging from each other from end to end of the wheel in a zigzag line, substantially as and for the purpose set forth.

In testimony that I claim the foregoing as my own invention, I affix my signature in presence of two witnesses.

BENJAMIN KUHNS.

Witnesses:
 WARREN MUNGER, Jr.,
 THOMAS J. KEATING.